(12) United States Patent
Ye et al.

(10) Patent No.: US 11,145,028 B2
(45) Date of Patent: Oct. 12, 2021

(54) IMAGE PROCESSING APPARATUS USING NEURAL NETWORK AND METHOD PERFORMED BY IMAGE PROCESSING APPARATUS

(71) Applicant: Korea Advanced Institute of Science and Technology, Daejeon (KR)

(72) Inventors: JongChul Ye, Yuseong-gu (KR); Yeohun Yoon, Yuseong-gu (KR); Shujaat Khan, Daejeon (KR); Jaeyoung Huh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 299 days.

(21) Appl. No.: 16/414,372

(22) Filed: May 16, 2019

(65) Prior Publication Data

US 2019/0355093 A1 Nov. 21, 2019

(30) Foreign Application Priority Data

May 17, 2018 (KR) .......................... 10-2018-0056648

(51) Int. Cl.
*G06K 9/00* (2006.01)
*G06T 3/40* (2006.01)
(Continued)

(52) U.S. Cl.
CPC .......... *G06T 3/4046* (2013.01); *G06N 3/084* (2013.01); *G06T 5/002* (2013.01); *G06T 2207/20084* (2013.01)

(58) Field of Classification Search
None
See application file for complete search history.

(56) References Cited

U.S. PATENT DOCUMENTS

2018/0374245 A1* 12/2018 Xu .................... A61B 6/5282
2019/0183462 A1* 6/2019 Yang .................... G06T 5/001

FOREIGN PATENT DOCUMENTS

JP              3263131 B2    3/2002
KR        20180010950 A    1/2018

OTHER PUBLICATIONS

Jin et al., "Compressive dynamic aperture b-mode ultrasound imaging using annihilating filter-based low-rank interpolation" (Year: 2016).*

(Continued)

*Primary Examiner* — Soo Jin Park
(74) *Attorney, Agent, or Firm* — Erik A. Huestis; Foley Hoag LLP (57) ABSTRACT

An image processing apparatus according to an embodiment removes the noise included in the three-dimensional input image, determines the lost information in a process of obtaining the three-dimensional input image, or enhances the resolution of the three-dimensional input image, by using the neural network learned in advance. The image processing apparatus slices the three-dimensional input image along a depth, converts a three-dimensional input image into a two-dimensional input image, and inputs the converted two-dimensional input image into a neural network. The image processing apparatus generates a three-dimensional output image of which the quality of the three-dimensional input image is enhanced, based on the output of the neural network.

18 Claims, 8 Drawing Sheets

(51) Int. Cl.
  *G06N 3/08*    (2006.01)
  *G06T 5/00*    (2006.01)

(56) References Cited

OTHER PUBLICATIONS

Luchies et al. ("Deep neural networks for ultrasound beamforming" (Year: 2010).*
Perdios et al., "A deep learning approach to ultrasound image recovery" (Year: 2017).*
Allman et al., "A machine learning method to identify and remove reflection artifacts in photoacoustic channel data" (Year: 2017).*
Yoon et al., "Deep learning in RF sub-sampled b-mode ultrasound imaging" (Year: 2017).*

* cited by examiner

IMAGE PROCESSING APPARATUS USING NEURAL NETWORK AND METHOD PERFORMED BY IMAGE PROCESSING APPARATUS

CROSS-REFERENCE TO RELATED APPLICATIONS

This application claims priority under 35 U.S.C. § 119 to Korean Patent Application No. 10-2018-0056648 filed on May 17, 2018, in the Korean Intellectual Property Office, the disclosures of which are incorporated by reference herein in their entireties.

BACKGROUND

Embodiments of the inventive concept described herein relate to an apparatus and a method that reconstructs an ultrasound image.

In signal processing, signal reconstruction is to remove noise elements included in a signal by using an algorithm or a system or to generate a high-dimensional signal by estimating information lost from a low-dimensional signal where some information is lost. The signal may be not only voice being a one-dimensional signal, an image being a two-dimensional signal, or a video being a three-dimensional signal but also any N-dimensional (N is a natural number) signal.

Signal loss means that the dimension of the original signal is lowered, due to a linear or nonlinear factor. The signal loss may be generated through performing calculation such as uniform/non-uniform sampling, projection, or the like.

The typical problem that occurs when the lost signal is reconstructed may include the problem of reconstructing a high-resolution image from a low-resolution image or the problem of separating overlapped images. Signal interpolation is frequently used when the lost signal is reconstructed, or interpolation or extrapolation may be used to estimate the lost signal. When a signal is reconstructed by using a conventional interpolation method, an interpolation function may be determined based on a given signal, and then an unknown value may be estimated based on the determined interpolation function. For example, the conventional interpolation method may be polynomial interpolation, spline interpolation, or the like. In addition, the method for estimating the lost signal using regression may be frequently used. Typically, there is a method for estimating the lost signal using dictionary learning of signals.

SUMMARY

Embodiments of the inventive concepts provide an image processing apparatus that enhances the quality of a three-dimensional input image based on a neural network.

Embodiments of the inventive concepts provide an image processing apparatus for enhancing a three-dimensional input image with improved performance using the small amount of computation based on a neural network.

According to an exemplary embodiment, a method for processing an image includes converting a three-dimensional input image into a two-dimensional input image in receiver-scanline coordinates, inputting the converted two-dimensional input image into a neural network learned in advance, and generating a three-dimensional output image in which a quality of the three-dimensional input image is enhanced, based on an output of the neural network.

According to an exemplary embodiment, the converting includes converting the three-dimensional input image into the two-dimensional input image by sampling the three-dimensional input image along directions of a plurality of receivers used to obtain the three-dimensional input image or directions of a plurality of scanlines used to obtain the three-dimensional input image.

According to an exemplary embodiment, the converting includes converting the three-dimensional input image into the two-dimensional input image by slicing the three-dimensional input image along a depth.

According to an exemplary embodiment, the generating includes removing a noise element included in the three-dimensional input image or adding lost information to the three-dimensional input image, based on the output of the neural network.

According to an exemplary embodiment, the generating includes determining a coefficient associated with the two-dimensional input image so as to adjust noise included in the two-dimensional input image, based on the output of the neural network.

According to an exemplary embodiment, the generating includes generating the output image by performing beamforming based on a coefficient of the two-dimensional input image including a result of enhancing a quality of the two-dimensional input image.

According to an exemplary embodiment, a method for processing an image includes converting a three-dimensional input image into a two-dimensional input image, based on directions of a receiver and a scanline, which are used to obtain the three-dimensional input image, inputting the converted two-dimensional input image into a neural network learned in advance to change a parameter associated with the converted two-dimensional input image, and generating a three-dimensional output image in which a quality of the three-dimensional input image is enhanced, based on the changed parameter.

According to an exemplary embodiment, the converting includes converting the three-dimensional input image into the two-dimensional input image by slicing the three-dimensional input image depending on a direction of a depth of the three-dimensional input image.

According to an exemplary embodiment, the converting includes converting the three-dimensional input image into the two-dimensional input image based on a receiver-scanline coordinate system determined based on the receiver and the scanline.

According to an exemplary embodiment, the changing includes removing a noise element included in the two-dimensional input image or determining information lost from the two-dimensional input image, using the neural network.

According to an exemplary embodiment, the generating includes performing beamforming on all parameters of the two-dimensional input image determined based on the changed parameter to the output image.

According to an exemplary embodiment, the generating includes determining information lost from the two-dimensional input image, based on the changed parameter.

According to an exemplary embodiment, the generating includes generating the three-dimensional output image including information lost from the two-dimensional input image, based on the changed parameter.

According to an exemplary embodiment, the method further includes performing pre-processing on the three-dimensional input image to extract the two-dimensional input image from the three-dimensional input image.

According to an exemplary embodiment, the method further includes performing post-processing on the generated three-dimensional output image.

According to an exemplary embodiment, the three-dimensional input image is obtained by using receivers, the number of which is less than the number of the receivers included in a device used to obtain an input image or is obtained by using scanlines, the number of which is less than the number of scanlines included in the device.

According to an exemplary embodiment, an image processing apparatus includes a memory storing a three-dimensional input image and a processor generating a three-dimensional output image in which a quality of the three-dimensional input image is enhanced, by using a neural network learned in advance. The processor is configured to convert the three-dimensional input image into a two-dimensional input image in receiver-scanline coordinates, to input the converted two-dimensional input image into the neural network, and to generate the three-dimensional output image based on an output of the neural network.

According to an exemplary embodiment, the processor is configured to convert the three-dimensional input image into the two-dimensional input image by sampling the three-dimensional input image along directions of a plurality of receivers used to obtain the three-dimensional input image or directions of a plurality of scanlines used to obtain the three-dimensional input image.

According to an exemplary embodiment, the processor is configured to convert the three-dimensional input image into the two-dimensional input image by slicing the three-dimensional input image along a depth.

According to an exemplary embodiment, the processor is configured to remove a noise element included in the three-dimensional input image or to add lost information to the three-dimensional input image, based on the output of the neural network.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

With regard to various embodiments according to the inventive concept disclosed in this specification, specific structural or functional descriptions are exemplified only for the purpose of describing embodiments according to the inventive concept, and the embodiments according to the inventive concept may be implemented in various different forms, not limiting the embodiments described in this specification.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover modifications, equivalents, and alternatives falling within the spirit and scope of the invention.

It will be understood that, although the terms "first," "second," or the like may be used herein in reference to elements of the invention, such elements should not be construed as being limited by these terms. These terms are only used to distinguish one element from another. For example, a first element could be termed a second element, and, similarly, a second element could be termed a first element, without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Words used to describe relationships between elements should be interpreted in a like fashion (e.g., "between" versus "directly between," "adjacent" versus "directly adjacent," etc.).

The terminology used herein to describe embodiments is not intended to limit the scope of the present disclosure. The articles "a," "an," and "the" are singular in that they have a single referent, however, the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms used herein should be interpreted as having a meaning that is consistent with their meaning in the context of the present disclosure and the relevant art and will not be interpreted in an idealized or overly formal sense unless expressly so defined herein.

Hereinafter, exemplary embodiments will be described in detail with reference to the accompanying drawings. However, the scope of the inventive concept is neither limited nor restricted by the embodiments. The same reference numerals in the drawings denote the same members.

Figure 1:
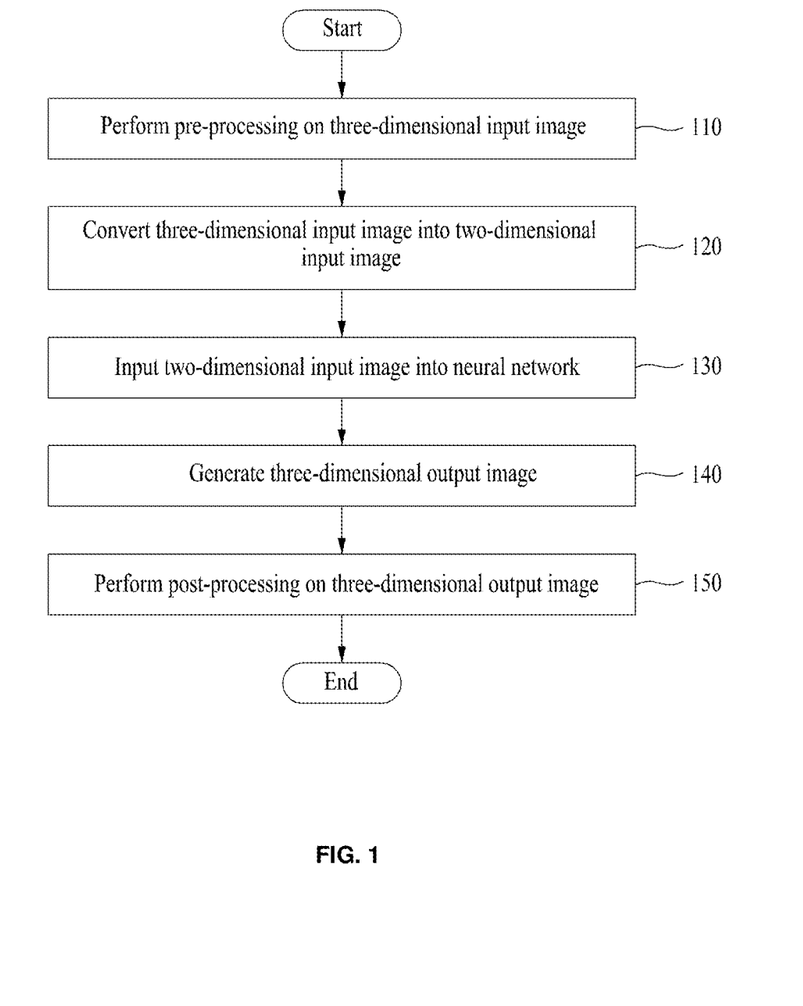
FIG. 1 is a flowchart for describing an operation in which an image processing apparatus processes an input image, according to an embodiment.

FIG. 1 is a flowchart for describing an operation in which an image processing apparatus processes an input image, according to an embodiment. An image processing apparatus may reconstruct an input image in consideration of the noise element included in the process of obtaining an input image being raw data or information lost in the process of obtaining the input image. Furthermore, the image processing apparatus may increase the resolution of an input image. The input image may be an image obtained by a sensor (e.g., a medical image apparatus, an image sensor included in an optical image apparatus, or a sound sensor included in an ultrasound image apparatus), for example, a medical image that includes a patient or a part of the patient. The input image may be an image, which includes a noise element or the part of which is lost. When the input image is an image obtained by the ultrasound image apparatus, the input image may be an ultrasound image captured by a linear transducer, an ultrasound image captured by a convex transducer, or an ultrasound image captured by another type of transducer.

The medical image apparatus may include magnetic resonance imaging (MRI), X-ray, X-ray computed tomography (CT), X-ray tomosynthesis, ultrasound image apparatus, and positron emission tomography (PET). The optical image apparatus may include optical microscopy, fluorescence microscopy, confocal microscopy, optical coherence tomography (OCT), and an endoscope image apparatus. The input image obtained through the medical image apparatus may be a three-dimensional input image based on a depth direction, a receiver direction, and a scanline direction.

Referring to FIG. 1, in operation 110, an image processing apparatus according to an embodiment may perform pre-processing on a three-dimensional input image. The image processing apparatus may convert a low-resolution input image into a high-resolution input image based on an interpolation method, an interpolation filter, or the like. The image processing apparatus may remove noise included in the input image, using a noise reduction filter. The image processing apparatus may perform pre-processing on the input image, using a partial frequency band filter. The image processing apparatus may perform pre-processing on the input image, using regression. Here, the regression means a method of using principle component analysis. The pre-processing of the input image by the image processing apparatus may be performed selectively.

Referring to FIG. 1, in operation 120, the image processing apparatus according to an embodiment may convert the pre-processed three-dimensional input image into a two-dimensional input image based on the receiver and the scanline, which are used to obtain a three-dimensional input image. For example, the image processing apparatus may convert the three-dimensional input image into the two-dimensional input image, based on receiver-scanline coordinates determined based on the receiver and the scanline of an ultrasound image apparatus obtaining the three-dimensional input image. Accordingly, the two-dimensional input image generated by converting the three-dimensional input image by the image processing apparatus may be a signal from regularizing the three-dimensional input image so as to correspond to the receiver-scan line coordinates. The operation in which the image processing apparatus generates the two-dimensional input image from the three-dimensional input image will be described later. According to some embodiments, the pre-processing operation in operation 110 may be also performed on the two-dimensional input image generated by converting the three-dimensional input image.

Referring to FIG. 1, in operation 130, the image processing apparatus may input the converted two-dimensional input image into a neural network learned in advance. The neural network may learn the parameters associated with the two-dimensional input image, for example, the coefficient of a two-dimensional input image, in advance. More specifically, the neural network may be a neural network that performs supervised learning on the input image converted into the two-dimensional input image of the receiver-scanline coordinates and the coefficients of the two-dimensional input image. The neural network may perform supervised learning on a large number of input images and coefficients. The neural network may include a part of additional calculation necessary for a supervised learned neural network.

As the two-dimensional input image is input to the neural network, the noise element included in the two-dimensional input image or the data associated with the information lost from the two-dimensional input image may be output from the neural network. In other words, the image processing apparatus may obtain information necessary to reconstruct the three-dimensional input image or to enhance the quality, using the neural network. Enhancing the quality of a three-dimensional input image may include at least one of eliminating the noise included in the three-dimensional input image, combining the lost information with the three-dimensional input image, or increasing the resolution of the three-dimensional input image. The coefficients of the two-dimensional input image determined by the neural network may include the positive and negative components of the coefficients of the two-dimensional input image converted based on the receiver and scanline.

The image processing apparatus according to an embodiment may change the coefficient of a local transform signal or the coefficient of a global transform signal by using the neural network, as parameters of the two-dimensional input image. The coefficient of the local transform signal means the coefficient for a partial area of the converted two-dimensional input image. The coefficient of the global transform signal means the coefficient for the entire area of the transformed signal. In other words, the neural network may learn the coefficient of the local transform signal or the global transform signal to enhance the quality of the two-dimensional input image.

The neural network may include a convolutional neural network (CNN). The neural network may include a nonlinear layer that performs one of a variety of rectified linear unit (ReLU), sigmoid, and Tanh operations. The neural network may include a batch normalization layer that uses a batch normalization operation as a leveling operation. The neural network may include a channel concatenation layer or a channel sum layer that combines the output of a plurality of layers within the neural network. The neural network may include one or more of the same arithmetic structures (e.g., modules). Here, normalization may be described interchangeably with leveling. The neural network may include a layer associated with a wavelet transform that calculates two-dimensional input images corresponding to different frequencies.

As the neural network is used, the amount of computation necessary for the image processing apparatus according to an embodiment to process an image may be reduced, the speed of processing an image may be improved, and the performance of improving image quality may be improved.

Referring to FIG. 1, in operation 140, the image processing apparatus according to an embodiment may generate a three-dimensional output image of which the quality of the three-dimensional input image is enhanced, based on the output of the neural network. The neural network may output the coefficient of the two-dimensional input image as a noise element included in the two-dimensional input image or data associated with information lost from the two-dimensional input image. The image processing apparatus may generate the three-dimensional output image based on the coefficient of the two-dimensional input image output from the neural network.

In other words, a three-dimensional output image may be generated by adding the result from removing the noise element of a two-dimensional input image using the neural network or the information lost from the two-dimensional input image. The image processing apparatus may perform inverse transform or beamforming on the entire coefficient determined based on the coefficient of the two-dimensional input image reconstructed by using the neural network, as the three-dimensional output image. The beamforming operation performed by the image processing apparatus may be differently performed depending on a type of an ultrasound image apparatus used to obtain the three-dimensional input image and various beamforming methods may be used.

Referring to FIG. 1, in operation 150, the image processing apparatus according to an embodiment may perform post-processing on the generated three-dimensional output image. The image processing apparatus may perform post-processing on the three-dimensional output image by applying a noise elimination filter, an interpolation filter, a regression, and a partial frequency band filter to an inverse-transformed or beamformed three-dimensional output image. According to some embodiments, the image processing apparatus may perform post-processing on the two-dimensional input image before performing the beamforming. The post-processing of the three-dimensional output image by the image processing apparatus may be performed selectively.

Figure 2:
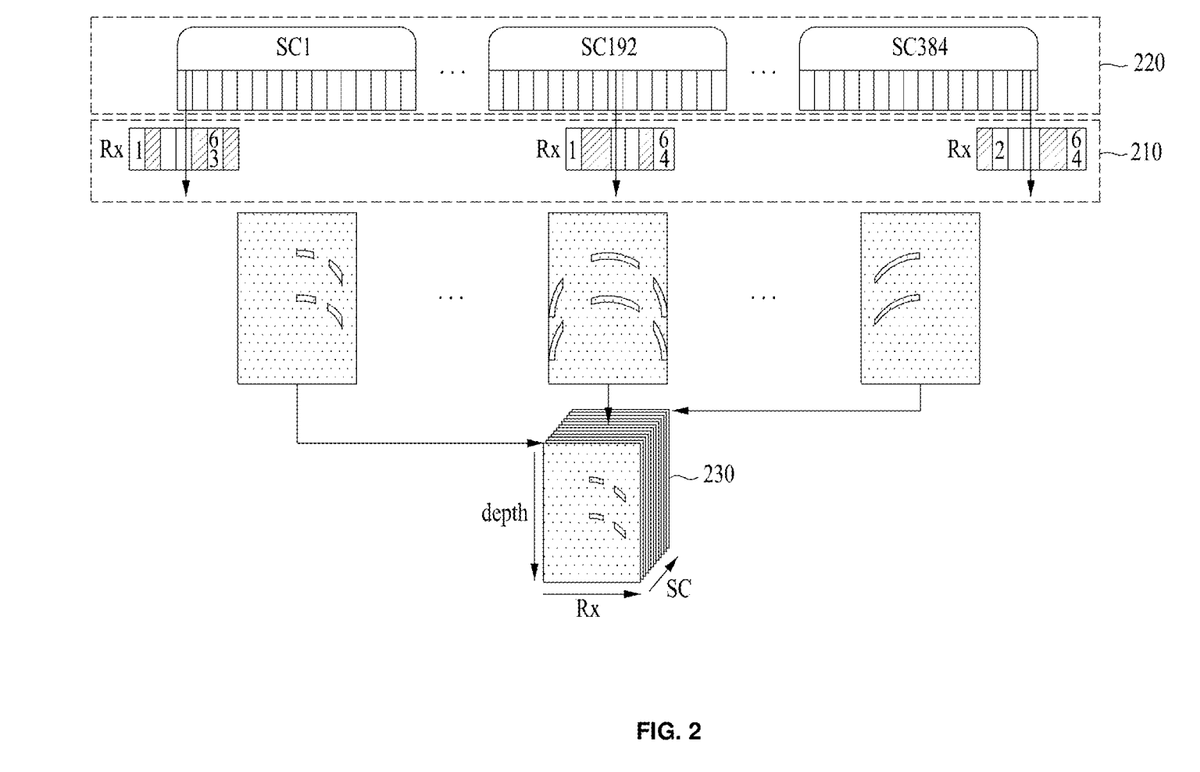
FIG. 2 is a view for describing a three-dimensional input image obtained by an image processing apparatus, according to an embodiment.

FIG. 2 is a view for describing a three-dimensional input image 230 obtained by an image processing apparatus, according to an embodiment.

An ultrasound image apparatus may include a plurality of receivers 210 receiving ultrasound. The three-dimensional input image 230 may be an ultrasound image obtained by using only a part of the plurality of receivers 210 included in an ultrasound image apparatus. When a three-dimensional input image is obtained by using receivers 210 the number of which is fewer than the receivers 210 included in the ultrasound image apparatus, the hardware memory and power consumption necessary to obtain the three-dimensional input image 230 may be reduced. The receiver used to obtain the three-dimensional input image 230 may be sampled or selected from the plurality of receivers 210 based on non-uniform sampling such as Gaussian random sampling or uniform sampling.

The ultrasound image apparatus may obtain the three-dimensional input image 230 by using a part of a plurality of scanlines 220. Since the number of scanlines used to capture the three-dimensional input image 230 is less than the total number of scanlines 220 of the ultrasound image apparatus, the time required to capture the three-dimensional input image 230 may be reduced. Furthermore, the three-dimensional input image 230 may be captured by using the receivers 210, the number of which is less than the total number of receivers 210, and the scanlines 220, the number of which is less than the total number of scanlines 220. In this case, the resource (e.g., hardware memory, power consumption, or the like) and time required to capture the three-dimensional input image 230 may be reduced at the same time.

The hardware memory and power consumption of the image processing apparatus may be reduced as the three-dimensional input image 230 generated by sampling the raw data obtained from the ultrasound image apparatus in the receiver element direction is used. The number of frames per second (frame rate) of the three-dimensional input image 230 may be reduced as the three-dimensional input image 230 generated by sampling raw data obtained by the ultrasound image apparatus in the scanline direction is used. Sampling the above-described raw data in the receiver element direction and sampling the raw data in the scanline direction may be performed at the same time. In this case, the hardware memory, the power consumption, and the frame rate of the image processing apparatus may be reduced.

Figure 3:
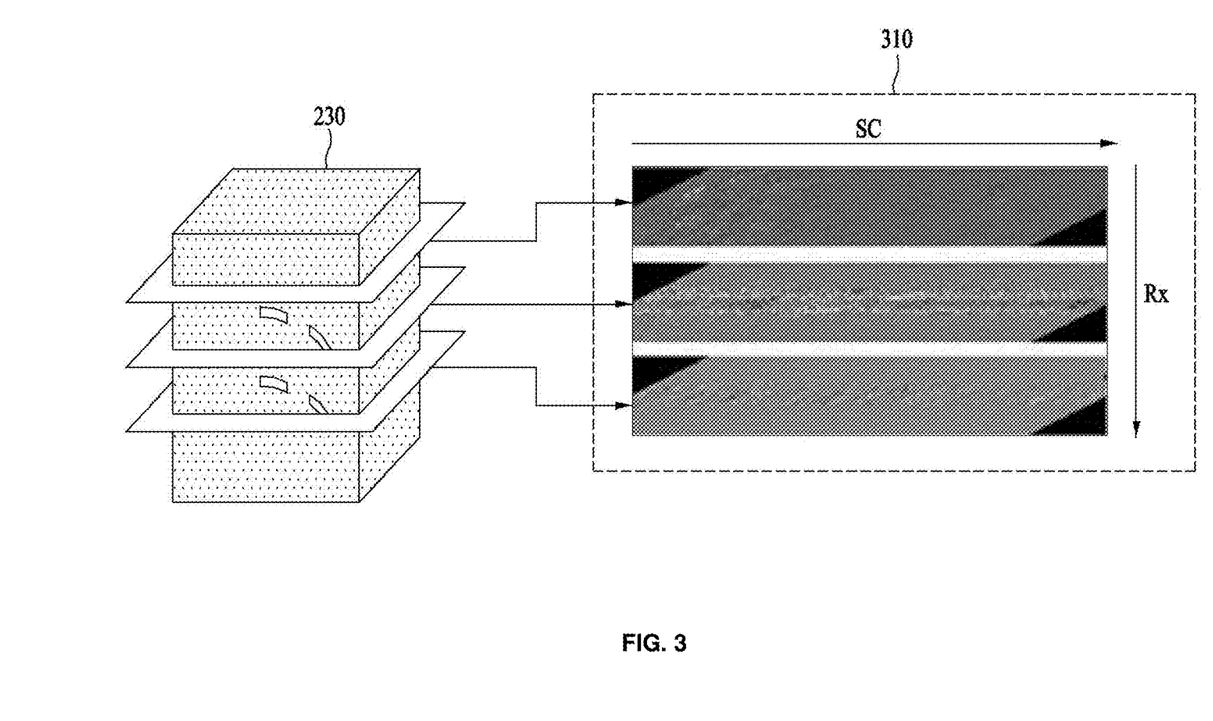
FIG. 3 is a view for describing an operation in which an image processing apparatus converts a three-dimensional input image of FIG. 2 into a two-dimensional input image, according to an embodiment.

FIG. 3 is a view for describing an operation in which an image processing apparatus converts the three-dimensional input image 230 of FIG. 2 into a two-dimensional input image 310, according to an embodiment.

Referring to FIG. 3, an image processing apparatus according to an embodiment may regularize the sampled three-dimensional input image 230 into the two-dimensional input image 310 of receiver-scanline coordinates. In more detail, the image processing apparatus may determine the two-dimensional input image 310 of receiver-scanline coordinates by cutting or slicing a three-dimensional input image 230 based on three axes (the axis corresponding to the receivers, the axis corresponding to a scanline, and the axis corresponding to a depth) so as to correspond to receiver-scanline coordinates based on two axes (e.g., the axis corresponding to the receivers and the axis corresponding to the scanline) of the three axes.

Accordingly, the plurality of two-dimensional input images 310 may be generated from the single three-dimensional input image 230. The three-dimensional input image 230 may correspond to aligning the plurality of two-dimensional input images 310 along an axis corresponding to depth. In other words, the two-dimensional input image 310 may correspond to a cross-section from slicing the three-dimensional input image 230 along the depth direction, as a cross-section of the three-dimensional input image 230. The image processing apparatus may use the two-dimensional input images 310, which are the cross-sections from cutting the three-dimensional input image 230 so as to correspond to the receiver-scanline coordinates, as an input of the neural network.

Figure 4:
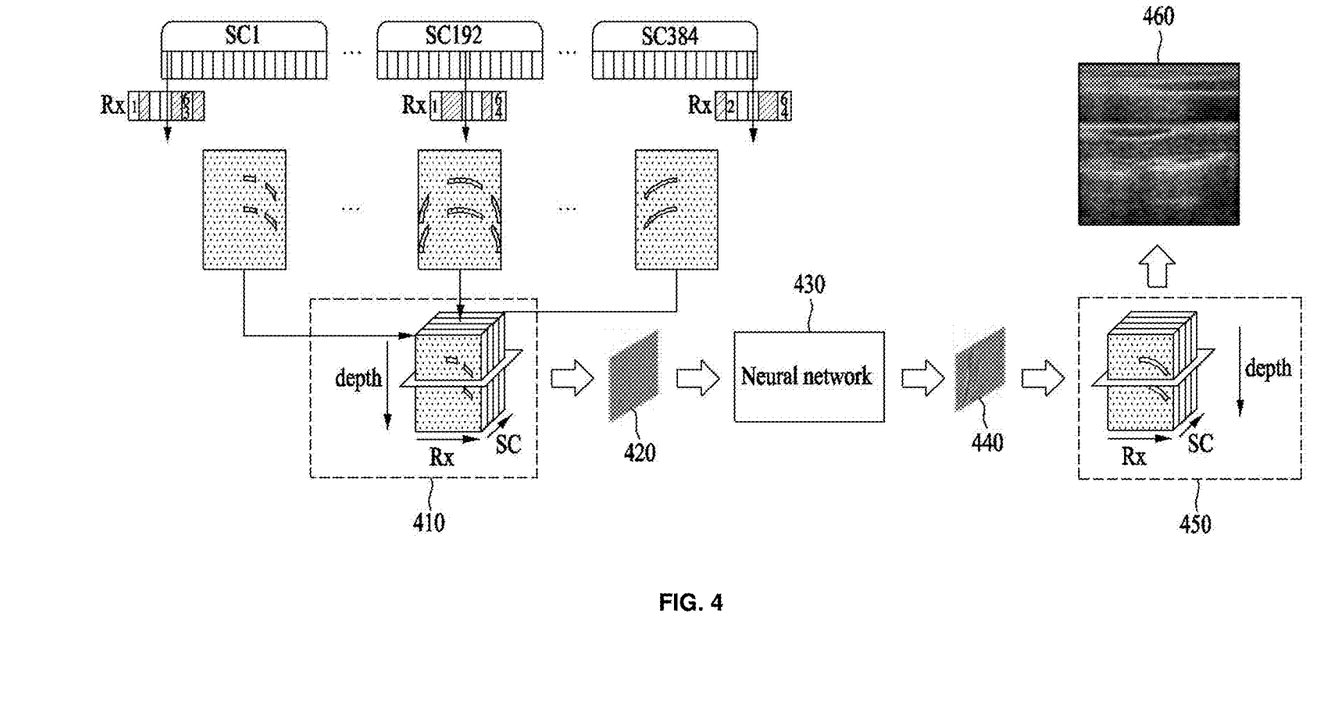
FIG. 4 is a view for describing an operation in which an image processing apparatus enhances a three-dimensional input image by using a neural network, according to an embodiment.

FIG. 4 is a view for describing an operation in which an image processing apparatus enhances a three-dimensional input image 410 by using a neural network 430, according to an embodiment. While the amount of computation required to reconstruct the three-dimensional input image 410 is reduced as the neural network 430 is being used, the reconstruction speed and reconstruction performance may be improved. Hereinafter, an operation in which an image processing apparatus reconstructs a signal lost from the three-dimensional input image 410 captured by a linear transducer will be described with reference to FIG. 4.

The three-dimensional input image 410 of FIG. 4 may correspond to the pre-processed three-dimensional input image in operation 110 of FIG. 1. The image processing apparatus may convert the three-dimensional input image 410 into a two-dimensional input image 420 of receiver-scanline coordinates, based on the operation described in FIG. 3.

The two-dimensional input image 420 in the receiver-scanline coordinates may be used as the input of the neural network 430 learned in advance. The neural network 430 may output a parameter (e.g., the coefficient of the two-dimensional input image 420) associated with the two-dimensional input image 420. The image processing apparatus may adjust the coefficient of the two-dimensional input image 420 based on the output of the neural network 430. Since the coefficient of the two-dimensional input image 420 is adjusted by using the neural network 430 learned in advance, the quality of the coefficient of the two-dimensional input image 420 may be enhanced. The image processing apparatus may adjust the coefficient of the two-dimensional input image 420 by using basis vectors. The basis vector may have a form satisfying a reconstruction condition (i.e., a condition of enhancing the quality of the two-dimensional input image 420) of the two-dimensional input image 420. The neural network may have a basis vector of a pre-learned low link. The image processing apparatus may generate a two-dimensional input image 440 in which information lost from the two-dimensional input image 420 is combined, by using the coefficients of the two-dimensional input image 420 reconstructed by the neural network 430.

The image processing apparatus may generate a three-dimensional output image 450 enhanced by collecting the two-dimensional input image 440 in which the lost information is combined. That is, the three-dimensional output image 450 may include information lost from the three-dimensional input image 410. The image processing apparatus may perform a post-processing operation, which is performed in operation 150 of FIG. 1, on the three-dimensional output image 450. The image processing apparatus may generate an ultrasound image 460 reconstructed by beamforming the three-dimensional output image 450. The ultrasound image 460 may be output through a display or may be output in a recording medium after being stored in the format of an image file.

Moreover, the image processing apparatus may enhance the quality of the two-dimensional input image, which is generated from the three-dimensional input image captured through a convex transducer, by using the neural network 430 learning the three-dimensional input image captured through the linear transducer and may generate the three-dimensional output image 450 by beamforming the two-dimensional input image, of which the quality is enhanced. The neural network 430 may learn the two-dimensional input image 420 in the receiver-scanline coordinates. The image processing apparatus may enhance the quality of the two-dimensional input image 420 generated by using not only a transducer, of which the type is the same as a transducer used for the two-dimensional input image 420 used to learn the neural network 430, but also other types of transducers. Accordingly, the constraints of hardware associated with the image processing apparatus may be overcome.

Figure 5:
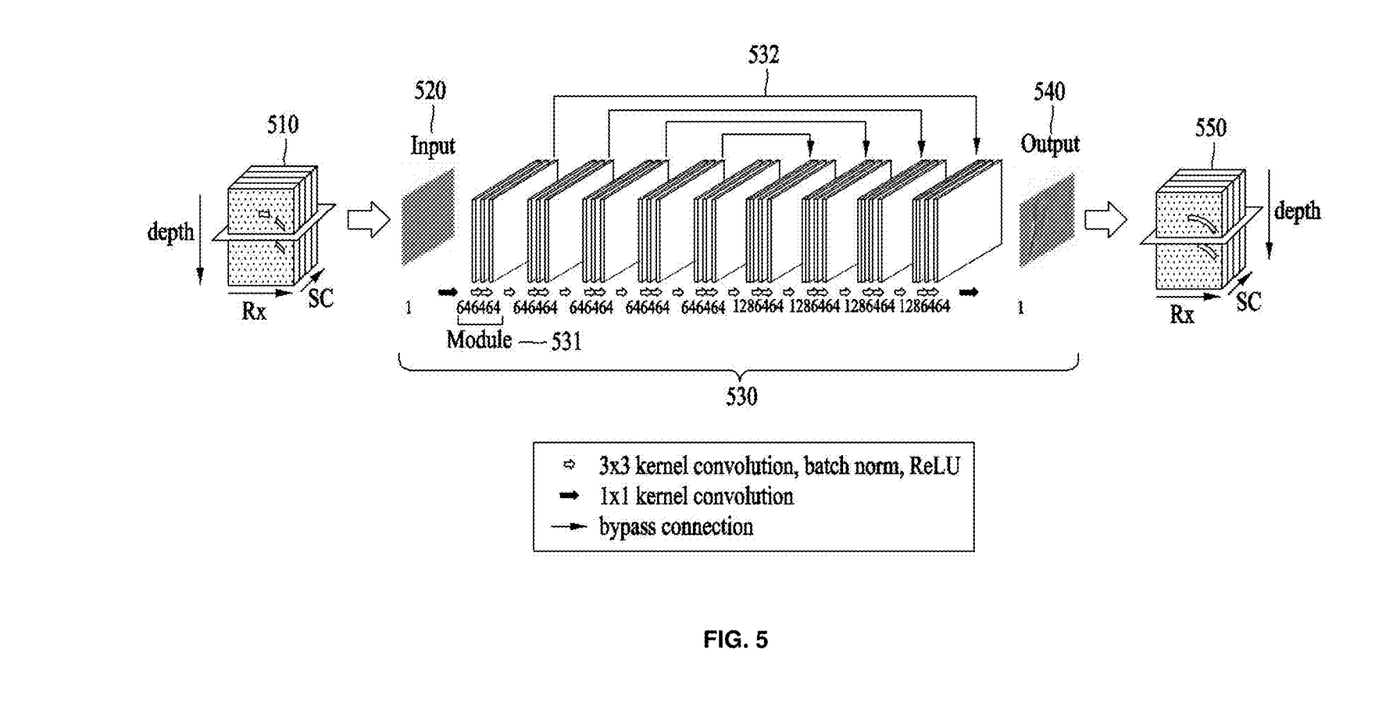
FIG. 5 is a view for describing an operation in which an image processing apparatus determines information lost from a two-dimensional input image by using a neural network, according to an embodiment.

FIG. 5 is a view for describing an operation in which an image processing apparatus determines information lost from a two-dimensional input image 520 by using a neural network 530, according to an embodiment. FIG. 5 illustrates a procedure in which an image processing apparatus reconstructs a three-dimensional input image 510, which is sampled in a receiver direction, as a three-dimensional output image 550, to which the lost information is added.

The three-dimensional input image 510 of FIG. 5 may be data pre-processed in operation 110 of FIG. 1, as an ultrasound data sampled in a receiver direction. The three-dimensional input image 510 may be ultrasound data sampled in a scanline direction or may be ultrasound data sampled in a receiver direction and a scanline direction. The two-dimensional input image 520 of FIG. 5 may be a signal converted in operation 120 of FIG. 1, as data from dividing the three-dimensional input image 510 based on receiver-scanline coordinates.

A two-dimensional input image 540 of FIG. 5 may be the two-dimensional input image 540, to which information lost from the two-dimensional input image 520 is added by using the neural network 530, in receiver-scanline coordinates. The three-dimensional output image 550 may be generated by beamforming the two-dimensional input image 540 to which the lost information is added. The image processing apparatus may perform a post-processing operation, which is performed in operation 150 of FIG. 1, on the three-dimensional output image 550.

The neural network 530 of FIG. 5 may be used by the image processing apparatus to determine the information lost from the two-dimensional input image 520; hereinafter, the arithmetic structure of the neural network 530 will be described with reference to FIG. 5. The image processing apparatus may perform an operation, which is performed in operation 130 of FIG. 1, using the neural network 530. The operation in operation 130 of FIG. 1 may be repeatedly performed depending on the structure of the neural network 530.

The neural network 530 may include a multi-layer, and a convolution layer for performing a linear transformation operation, a batch normalization layer for performing a normalization operation, and a Rectified Linear Unit (ReLU) layer for performing a nonlinear function may be interposed between the layers. The operations performed in the above-described layer may be performed based on parameters, and the parameters may be learned through supervised learning. The image processing apparatus may perform a supervised learning on the parameters by determining the loss function and then adjusting the parameters such that the value of the determined loss function is minimized. The problem of minimizing the loss function L(~) may be defined as Equation 1.

$$\min_{\theta} L(f(\theta, y), x) \qquad \text{[Equation 1]}$$

In Equation 1, 'y' denotes the two-dimensional input image 520; neural network θ denotes a set of parameters of neural network 'f'; 'x' denotes a reference signal, and f(θ, y) denotes the two-dimensional input image 540 output from the neural network 530. The loss function L(a, b) in Equation 1 may use $l_p$-norm and may be defined as Equation 2.

$$L(f(\theta,y),x) = \|f(\theta,y) - x\|_p^p \qquad \text{[Equation 2]}$$

When vector 'x', the size of which is 'n', is $\|x\|_p$ (p>0), $\|x\|_p$ may be defined as Equation 3.

$$\|x\|_p = (|x_1|^p + |x_2|^p + |x_3|^p \ldots |x_n|^p)^{\frac{1}{p}} \qquad \text{[Equation 3]}$$

The supervised learning may solve the minimization problem by adding a regularization term for the parameter θ of the neural network 530 as shown in Equation 4 to prevent the reference signal 'x' of the loss function from being overfitted.

$$\min_{\theta} L(f(\theta, y), x) + \phi(\theta) \qquad \text{[Equation 4]}$$

$\phi(\cdot)$ in Equation 4 may use $l_p$-norm. For example, the problem of minimizing the loss function and the regularization term using $l_2$-norm may be expressed as Equation 5.

$$\min_{\theta} \|f(\theta, y) - x\|_2^2 + \|\theta\|_2^2 \qquad \text{[Equation 5]}$$

The minimization problem for performing supervised learning on the parameter θ of the neural network 530 may generally be performed through back propagation. While the supervised learning is performed on the parameter θ of the neural network 530 by using the back propagation, each of the parameters of the neural network 530 may be repeatedly modified through gradient descent based on the first derivative. For example, each of the parameters of neural network 530 may be modified based on Equation 6.

$$\theta_l^{t+1} = \theta_l^t - \tau\left(\frac{\partial L}{\partial \theta_l}(\theta_l^t) + \frac{\partial \phi}{\partial \theta_l}(\theta_l^t)\right) \qquad \text{[Equation 6]}$$

In Equation 6, $\theta_l$ denotes any parameter of the operation involving the l-th layer '$f_l$' and 't' denotes the number of times that the parameter is modified. The gradient $$\frac{\partial L}{\partial \theta_l}(\theta_l^t)$$

may be usually calculated based on the chain rule of the derivative, and may be calculated based on, for example, Equation 7.

$$\frac{\partial L}{\partial \theta_l} = \frac{\partial L}{\partial f_L}\frac{\partial f_L}{\partial f_{L-1}}\cdots\frac{\partial f_{l+1}}{\partial f_l}\frac{\partial f_l}{\partial \theta_l} \qquad \text{[Equation 7]}$$

The linear transform operation performed by the neural network 530 may include an arbitrary order convolution operation, and the neural network in which the linear transform is represented as convolution may be referred to as "CNN".

The nonlinear function operation performed by neural network 530 may be performed based on ReLU (Equation 8), sigmoid (Equation 9), and tanh (Equation 10).

$$f(x) = \max(x, 0) \qquad \text{[Equation 8]}$$

$$f(x) = \frac{1}{1 + e^{-x}} \qquad \text{[Equation 9]}$$

$$f(x) = \frac{e^x - e^{-x}}{e^x + e^{-x}} \qquad \text{[Equation 10]}$$

'f' in Equation 8 to Equation 10 may be identically applied to the respective value of the input signal. The above-described nonlinear function operation may be used to adjust the coefficient of the two-dimensional input image 520, by being applied to the coefficient of the two-dimensional input image 520. Alternatively, the image processing apparatus may adjust the coefficient of the two-dimensional input image 520 by applying the activation functions to the coefficient of the two-dimensional input image 520. The nonlinear function used to adjust the activation function and the coefficient of two-dimensional input image 520 may have perfect reconstruction characteristics.

The normalization operation may include a batch normalization scheme, and the batch normalization may be expressed as Equation 11.

$$\hat{x}_i = \frac{x_i - \mu}{\sqrt{\sigma^2 + \epsilon}} \qquad \text{[Equation 11]}$$

In Equation 11, μ and ? are parameter values learned by the supervised learning, and ∈ is an arbitrary constant value.

The neural network 530 of FIG. 5 may include a module 531 having the same arithmetic structure. The module 531 may include a module that adds outputs of different layers. The plurality of modules 531 may be included in the neural network 530. The module 531 illustrated in FIG. 5 corresponds to only one embodiment, but is not limited thereto. The neural network 530 may include a concatenation portion 532 that sequentially appends various output values of different layers.

The neural network 530 according to an embodiment may include a plurality of convolution layers, and the batch normalization layer and the ReLU layer may be disposed after the convolution layer. Moreover, a 3×3 convolution filter may be used as a convolution layer. Each module may be composed of a bypass connection and a plurality of convolution layers. Furthermore, the neural network 530 may include a channel concatenation layer 532 that combines multiple outputs of the previous layer in the channel dimension. This allows the gradient to be propagated back through different paths, and thus rapid end-to-end learning is possible.

The neural network according to an embodiment may be learned to minimize the loss function in Equation 12.

$$L(w, x, y) = \sum_j \|F(w, x)_j - y_j\|_1^1 + \lambda \sum_k \|w_k\|_1^1 \qquad \text{[Equation 12]}$$

'w' in Equation 12 is the set of all network parameters including the coefficients of the convolution filters and the parameters in batch normalization layers; each of 'x' and 'y' is the two-dimensional input image 520 of the sampled receiver-scanline coordinates and a two-dimensional input image of the normal receiver-scanline coordinates. F(w, x) denotes a reconstructed two-dimensional input image 540 of the receiver-scanline coordinates. The normalization parameter (or decay rate) may be used. The minimization of the loss function may be performed based on error back propagation. In the error back propagation, the initial learning rate may be set, and the learning rate may be continuously reduced. The convolution kernel weights of the neural network may be initialized using any Gaussian distribution. The loss function may be minimized using a mini-batch gradient descent algorithm. Also, the 2-D signal of the receiver-scanline coordinates, which is learned to increase data, may be randomly shifted, flipped, or rotated.

Figure 6:
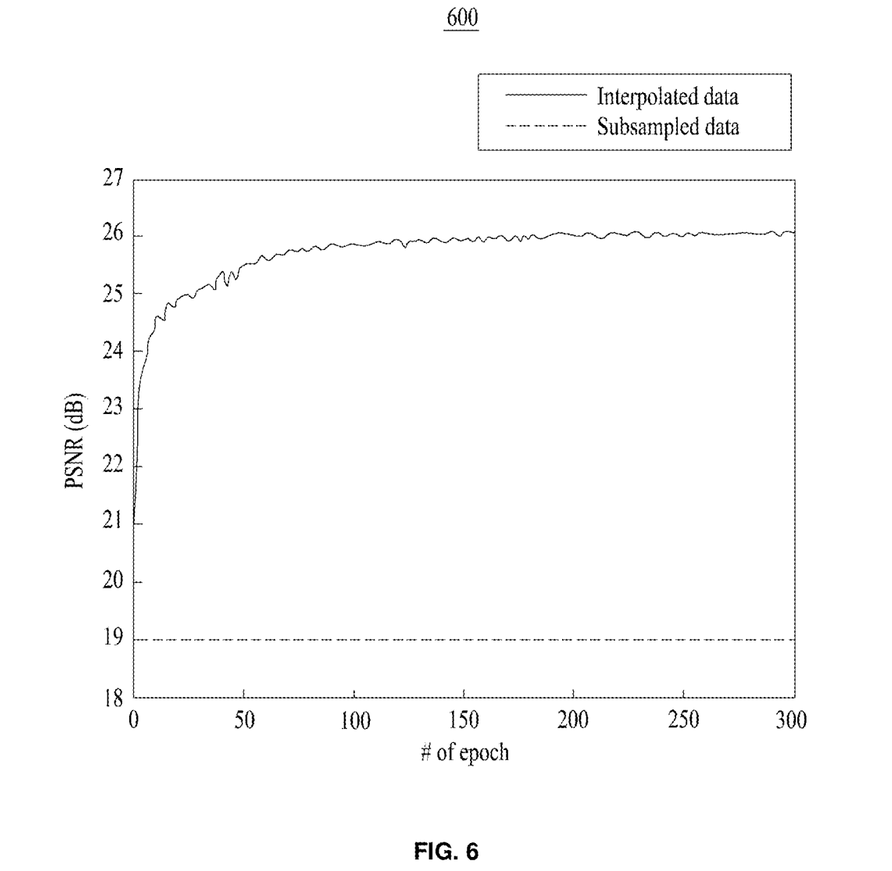
FIG. 6 is a graph illustrating efficiency obtained as an image processing apparatus uses the neural network, according to an embodiment.

FIG. 6 is a graph 600 illustrating efficiency obtained as an image processing apparatus uses the neural network, according to an embodiment. The graph 600 may indicate the efficiency of the supervised learning.

The graph 600 illustrates the learned result of the neural network used to determine information lost from a two-dimensional input image of sampled receiver-scanline coordinates. It is understood that the result of determining the information lost from the two-dimensional input image of sampled receiver-scanline coordinates as a neural network is good compared with the sampled two-dimensional input image of the receiver-scanline coordinates in peak signal to noise ratio (PSNR).

Figure 7:
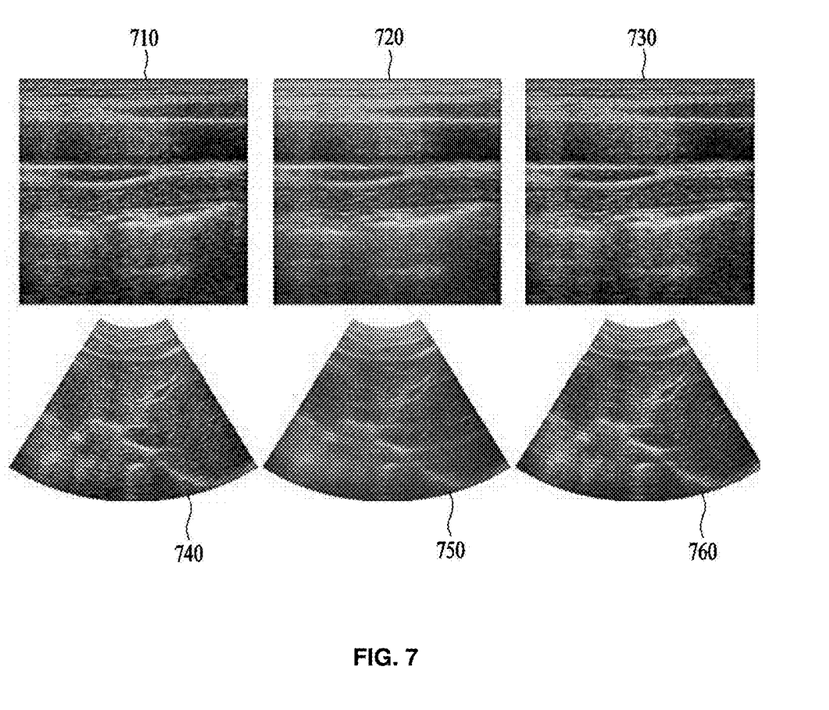
FIG. 7 is a view illustrating a three-dimensional output image generated by an image processing apparatus by comparing a three-dimensional input image with a three-dimensional input image generated from a two-dimensional input image of receiver-scanline coordinates obtained by using sampling, according to an embodiment.

FIG. 7 is a view illustrating a three-dimensional output image generated by an image processing apparatus by comparing a three-dimensional input image with a three-dimensional input image generated from a two-dimensional input image of receiver-scanline coordinates obtained by using sampling, according to an embodiment.

An image 710 of FIG. 7 is a normal ultrasound image captured without sampling, that is, by using all receivers and all scanlines of an ultrasound image apparatus. An image 720 of FIG. 7 is an image generated based on a two-dimensional input image of receiver-scanline coordinates captured by performing sampling, that is, by using the sampled part of receivers and scanlines of the ultrasound image apparatus. An image 730 of FIG. 7 is an image from beamforming a three-dimensional output image with which the information lost from the two-dimensional input image is combined by using a neural network learned in advance. The images 710, 720, and 730 may be generated from an ultrasound image (three-dimensional input image) captured by using a linear transducer.

Images 740, 750, and 760 of FIG. 7 may be an ultrasound image captured by using a convex transducer. The image 740 is a normal ultrasound image captured by using the ultrasound image apparatus including the convex transducer. The image 750 of FIG. 7 is an image generated based on a two-dimensional input image of receiver-scanline coordinates captured by using the sampled part of receivers and scanlines of the ultrasound image apparatus. The image 760 of FIG. 7 is an ultrasound image generated by beamforming a two-dimensional input image of receiver-scanline coordinates with which the information lost from the two-dimensional input image is combined by using the neural network learned in advance.

The image 760 may be generated from the enhanced result using the neural network learning the ultrasound signal captured through a linear transducer and the ultrasound signal captured through a convex transducer. Similarly, the image processing apparatus may enhance the quality of an input image captured through the linear transducer, using the neural network learned based on an input image captured through the convex transducer. Referring to FIG. 7, it is understood that the images 730 and 760 have the superior quality compared with the images 720 and 750.

Figure 8:
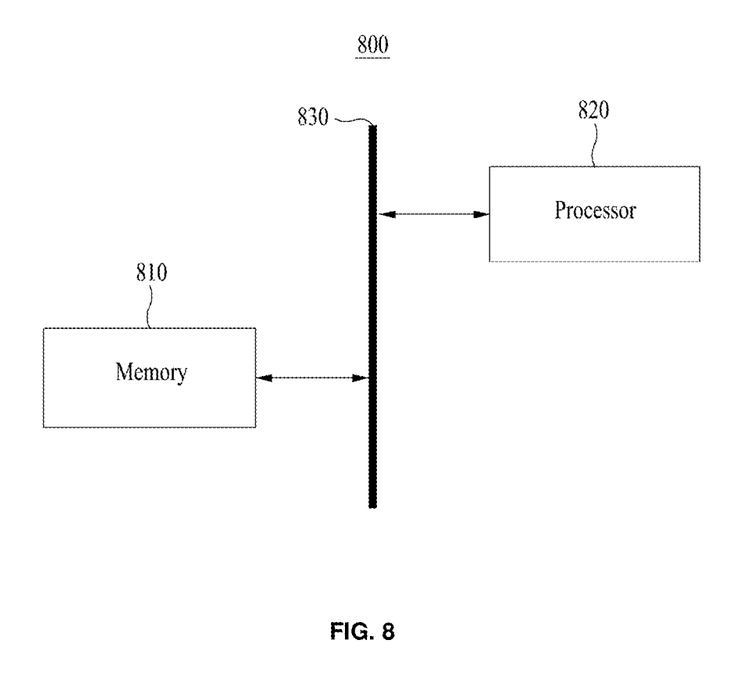
FIG. 8 is a diagram illustrating an image processing apparatus, according to an embodiment.

FIG. 8 is a diagram illustrating an image processing apparatus 800, according to an embodiment.

Referring to FIG. 8, the image processing apparatus 800 according to an embodiment includes a memory 810 and a processor 820. The memory 810 and the processor 820 may communicate with each other through a bus 830.

The memory 810 may include computer-readable instructions. A three-dimensional input image, a two-dimensional input image from converting the three-dimensional input image, and a three-dimensional output image may be stored in the memory 810. Parameters associated with a neural network may be stored in the memory 810.

The processor 820 may perform the operations described above as the instructions stored in the memory 810 are executed by the processor 820. The memory 810 may be a volatile memory or a non-volatile memory.

The memory 810 may include computer-readable instructions. The processor 820 may perform the operations described above as the instructions stored in the memory 810 are executed by the processor 820. The memory 810 may be a volatile memory or a non-volatile memory.

For example, the processor 820 may include a Central Processing Unit (CPU) and a Graphic Processing Unit (GPU) as a device for executing commands or programs or for controlling the image processing apparatus 800. The image processing apparatus 800 is connected to an external device (e.g., an image capturing apparatus, a personal computer, or a network) through an input/output device (not shown), and may exchange data. For example, the image processing apparatus 800 may receive an input image through an image sensor. The image processing apparatus 800 may be implemented with at least part of a computing device (e.g., a personal computer, a tablet computer, a netbook, or the like), a mobile device (e.g., a mobile phone, a smart phone, a PDA, a tablet computer, a laptop computer, or the like), or an electronic product (e.g., a smart television, a security device for gate control, or the like). In addition, the image processing apparatus 800 may process the above-described operations.

The processor 820 may convert a three-dimensional input image into a two-dimensional input image in receiver-scanline coordinates, may input the converted two-dimensional input image into a neural network, and may generate a three-dimensional output image based on the output of a neural network.

Since descriptions given through FIGS. 1 to 7 are applied to the components illustrated in FIG. 8, the detailed description will be omitted.

To sum up, the image processing apparatus according to an embodiment may remove the noise included in the three-dimensional input image by using the neural network, may determine the lost information in a process of obtaining the three-dimensional input image by using the neural network, or may enhance the resolution of the three-dimensional input image by using the neural network. The image processing apparatus may be applied to not only the three-dimensional input image but also a signal of various dimensions. Accordingly, the image processing apparatus according to an embodiment may be applied to not only a voice signal, an image signal, a video but also medical image data. Moreover, as the image processing apparatus uses the neural network, the time and performance required to enhance the quality of the three-dimensional input image may be improved.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments of the inventive concept or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

An image processing apparatus according to an embodiment may enhance the quality of a three-dimensional input image based on a neural network.

An image processing apparatus according to an embodiment may enhance the quality of the three-dimensional input image with improved performance and the small amount of computation based on the neural network.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for processing an image, the method comprising:
    converting a three-dimensional input image into a two-dimensional input image in receiver-scanline coordinates;
    inputting the converted two-dimensional input image into a neural network learned in advance; and
    generating a three-dimensional output image in which a quality of the three-dimensional input image is enhanced, based on an output of the neural network, wherein
    the generating includes: determining a coefficient associated with the two-dimensional input image so as to adjust noise included in the two-dimensional input image, based on the output of the neural network.

2. The method of claim 1, wherein the converting includes:
    converting the three-dimensional input image into the two-dimensional input image by sampling the three-dimensional input image along directions of a plurality of receivers used to obtain the three-dimensional input image or directions of a plurality of scanlines used to obtain the three-dimensional input image.

3. The method of claim 1, wherein the converting includes:
    converting the three-dimensional input image into the two-dimensional input image by slicing the three-dimensional input image along a depth.

4. The method of claim 1, wherein the generating includes:
    removing a noise element included in the three-dimensional input image or adding lost information to the three-dimensional input image, based on the output of the neural network.

5. The method of claim 1, wherein the generating includes:
    generating the output image by performing beamforming based on a coefficient of the two-dimensional input image including a result of enhancing a quality of the two-dimensional input image.

6. A method for processing an image, the method comprising:
    converting a three-dimensional input image into a two-dimensional input image, based on directions of a receiver and a scanline, which are used to obtain the three-dimensional input image;
    inputting the converted two-dimensional input image into a neural network learned in advance to change a parameter associated with the converted two-dimensional input image; and
    generating a three-dimensional output image in which a quality of the three-dimensional input image is enhanced, based on the changed parameter, wherein
    the generating includes: determining information lost from the two-dimensional input image, based on the changed parameter.

7. The method of claim 6, wherein the converting includes:
    converting the three-dimensional input image into the two-dimensional input image by slicing the three-dimensional input image depending on a direction of a depth of the three-dimensional input image.

8. The method of claim 6, wherein the converting includes:
converting the three-dimensional input image into the two-dimensional input image based on a receiver-scanline coordinate system determined based on the receiver and the scanline.

9. The method of claim 6, wherein the changing includes:
removing a noise element included in the two-dimensional input image or determining information lost from the two-dimensional input image, using the neural network.

10. The method of claim 6, wherein the generating includes:
performing beamforming on all parameters of the two-dimensional input image determined based on the changed parameter to the output image.

11. A method for processing an image, the method comprising:
converting a three-dimensional input image into a two-dimensional input image, based on directions of a receiver and a scanline, which are used to obtain the three-dimensional input image;
inputting the converted two-dimensional input image into a neural network learned in advance to change a parameter associated with the converted two-dimensional input image; and generating a three-dimensional output image in which a quality of the three-dimensional input image is enhanced, based on the changed parameter, wherein
the generating includes: generating the three-dimensional output image including information lost from the two-dimensional input image, based on the changed parameter.

12. The method of claim 6, further comprising:
performing pre-processing on the three-dimensional input image to extract the two-dimensional input image from the three-dimensional input image.

13. The method of claim 6, further comprising:
performing post-processing on the generated three-dimensional output image.

14. The method of claim 6, wherein the three-dimensional input image is obtained by using receivers, the number of which is less than the number of the receivers included in a device used to obtain an input image or is obtained by using scanlines, the number of which is less than the number of scanlines included in the device.

15. An image processing apparatus comprising:
a memory configured to store a three-dimensional input image; and
a processor configured to generate a three-dimensional output image in which a quality of the three-dimensional input image is enhanced, by using a neural network learned in advance,
wherein the processor is configured to:
convert the three-dimensional input image into a two-dimensional input image in receiver-scanline coordinates;
input the converted two-dimensional input image into the neural network;
determine a coefficient associated with the two-dimensional input image so as to adjust noise included in the two-dimensional input image, based on the output of the neural network; and
generate the three-dimensional output image based on an output of the neural network.

16. The image processing apparatus of claim 15, wherein the processor is configured to:
convert the three-dimensional input image into the two-dimensional input image by sampling the three-dimensional input image along directions of a plurality of receivers used to obtain the three-dimensional input image or directions of a plurality of scanlines used to obtain the three-dimensional input image.

17. The image processing apparatus of claim 15, wherein the processor is configured to:
convert the three-dimensional input image into the two-dimensional input image by slicing the three-dimensional input image along a depth.

18. The image processing apparatus of claim 15, wherein the processor is configured to:
based on the output of the neural network,
remove a noise element included in the three-dimensional input image; or
add lost information to the three-dimensional input image.

* * * * *